(12) United States Patent
Joshi et al.

(10) Patent No.: US 12,182,513 B2
(45) Date of Patent: Dec. 31, 2024

(54) SYSTEM AND METHOD FOR K-NUGGET DISCOVERY AND RETROFITTING FRAMEWORK AS SELF-ORGANISING TREE ALGORITHM (SOTA) FACTORY

(71) Applicant: Jio Platforms Limited, Gujarat (IN)

(72) Inventors: Prasad Pradip Joshi, Maharashtra (IN); Chinesh Doshi, Madhya Pradesh (IN); Naman Gupta, Madhya Pradesh (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 238 days.

(21) Appl. No.: 17/823,848

(22) Filed: Aug. 31, 2022

(65) Prior Publication Data

US 2023/0092651 A1 Mar. 23, 2023

(30) Foreign Application Priority Data

Sep. 1, 2021 (IN) .............................. 202121039527

(51) Int. Cl.
*G06F 40/284* (2020.01)
*G06F 40/247* (2020.01)
*G06F 40/30* (2020.01)

(52) U.S. Cl.
CPC .......... *G06F 40/284* (2020.01); *G06F 40/247* (2020.01); *G06F 40/30* (2020.01)

(58) Field of Classification Search
CPC ....... G06F 40/247; G06F 40/284; G06F 40/30
See application file for complete search history.

(56) References Cited

U.S. PATENT DOCUMENTS

| | | | |
|---|---|---|---|
| 2015/0310099 A1* | 10/2015 | Convertino | G06F 40/30 707/739 |
| 2022/0044135 A1* | 2/2022 | Yu | G06N 20/00 |
| 2022/0121702 A1* | 4/2022 | Kale | G06N 3/04 |
| 2023/0154172 A1* | 5/2023 | Wasnik | G06V 10/22 382/157 |

* cited by examiner

Primary Examiner — Eric Yen
(74) Attorney, Agent, or Firm — FINNEGAN, HENDERSON, FARABOW, GARRETT & DUNNER, LLP

(57) ABSTRACT

The present disclosure provides a system (110) for retrofitting words represented using the vectors for Natural Language Processing (NLP) models and a streamlined process which is an ideal pipeline for any NLP tasks. The system (110) may discover the user meta data or k-nuggets in five stages for retrofitting and stacking the retrofitted embeddings. Further, the system (110) may use the retrofitted embeddings for NLP Tasks. The five stages of the k-nugget discovery pipeline are Lexical, Syntactic, Semantic, transactional, and language agnostic stages for retrofitting the word embeddings. The proposed embedding layer is replaced with the retrofitted embedding which may be obtained after the fifth stage and improved performance can be achieved. To validate the approach, the K-nugget discovery pipeline has been tested on the SemEval (Hinglish and English Tweet dataset) and HOT dataset (Hinglish Tweet dataset) and to achieve state of the art results on the test dataset.

26 Claims, 11 Drawing Sheets

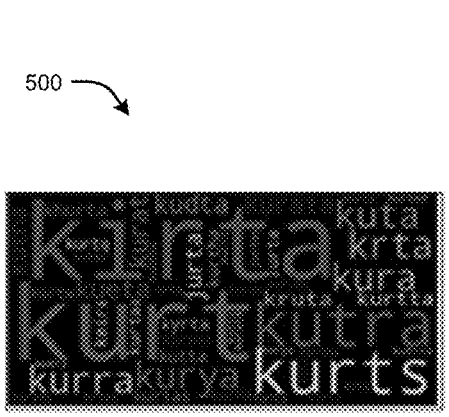
FIG. 5
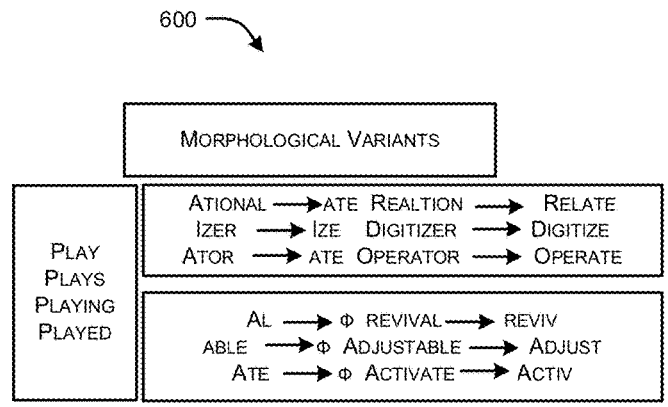
FIG. 6
700 →
| EMBD["PLAYS"] | | EMBD["PLAYS"] + EMBD[PAST_TENSE] | |
|---|---|---|---|
| WORD | SCORE | WORD | SCORE |
| PLAYSPY | 0.597403 | PLAYED | 0.594603 |
| REPLAY | 0.581863 | REPLAYS | 0.545317 |
| PLAYING | 0.561068 | PLAYSPY | 0.544224 |
| PLAYED | 0.553962 | PLAYING | 0.540695 |
| SLAYS | 0.545924 | SLAYS | |
| PLAYED | 0.544545 | PLAYD | 0.512803 |
| PLAYTV | 0.543321 | PLAYTV | 0.503024 |
| PLAY | 0.539317 | PLAYSCHOOL | 0.494055 |
| PLAYSCHOOL | 0.524867 | | |
POSITIVE SLOPE
FIG. 7A

900

Semantic Relations

Lindt Luxury Dark Chocolates
[BRAND]  <—>  [PRODUCT *(Grocery)*]

Steve Jobs founder of Apple
[PERSON]  <—>  [BRAND (ORG)]
NOT FRUIT

Taj Mahal situated in Agra
[Geographical Entity]  <—>  [LOCATION *(LOC)*]

FIG. 9A

CAPTURING SEMANTIC CONTEXT
Some other Semantic captures :-

1. Capturing ALIAS of Entities
   SRK [MOVIE] —> Shahrukh Khan
   UCB [FASHION] —> United Colors Benetton
   Master Blaster —> Sachin Tendulkar 2. Understanding slogans for the entities
   Just Do It —> NIKE
   Being Human —> Salman Khan 3. Understanding word context (disambiguation)
   Mango —> BRAND / COLOUR / FRUIT

Long Term Context - *Complements*

Brand Growth Rules
Britannia (RUSK) <—> Amul (MILK)
Tata Agni (TEA) <—> Madhur (Sugar)
Nandini (MILK) <—> TopNTown (Bread)
Wonder (Pizza Base) <—> Amul (Cheese)

Product Growth Rules
Milk <—> Bread
Sugar <—> Tea
Pizza Base <—> Cheese
Uncle Chips <—> Coca Cola

Short Term Context - *Substitutes*

Brand Substitutes

Product Substitutes

SYSTEM AND METHOD FOR K-NUGGET DISCOVERY AND RETROFITTING FRAMEWORK AS SELF-ORGANISING TREE ALGORITHM (SOTA) FACTORY

FIELD OF INVENTION

The embodiments of the present disclosure generally relate to Natural language Processing (NLP). More particularly, the present disclosure relates to a system and method for K-nugget discovery and retrofitting framework as self-organising tree algorithm (SOTA) factory.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Lately, Artificial Intelligence and Machine Learning are hot topics in the technology industry. Perhaps, more than our daily lives, Artificial Intelligence (AI) is impacting the business world more. Machine learning (ML) involves computers discovering how they can perform tasks without being explicitly programmed to do so. Natural language processing (NLP) refers to the branch of computer science—and more specifically, the branch of Artificial Intelligence or AI—concerned with giving computers the ability to understand text and spoken words in much the same way human beings can.

Word embedding is one of the most popular representations of document vocabulary, which is capable of capturing a context of a word in a document, semantic and syntactic similarity, relation with other words, etc. Word embeddings are vector representations of a particular word. But, the vector representations in Glove are formed using distributional features (frequency of co-occurrence). Certain analyses have proved that the vector representations in Glove are not semantically aware. English has so many words that are ambiguous i.e., a word that has more than one meaning. Singular representation of all the meanings of a word hurts the ML model performance. For example, when a human thinks about "rose", we recall all the characteristics of a rose and filter the one which is relevant to the context: Rose as a colour, Rose as a flower, Indic variants of rose, an object to express love, and many more. Hence, we propose that rose is not a word that has some embedding but it is a concept.

For most of the NLP tasks, words are being described as the embeddings. However, the most important thing which should be taken care of is that the linguistic characteristics of the word should also be preserved while considering or fine-tuning an embedding for any NLP task. Widely used NLP methods for training the embeddings are Word2Vec or BERT. ATTRACT-REPEL is another method to fine-tune the embeddings which can incorporate the linguistic constraints but are restricted to antonyms and synonyms. Also, they have used grid search for hyperparameter tuning.

There is, therefore, a need in the art to provide an automated system and a method that overcomes the shortcomings of the prior art.

Objects of the Present Disclosure

Some of the objects of the present disclosure, which at least one embodiment herein satisfy are as listed herein below.

It is an object of the present disclosure to provide an automated system and a method for facilitating a streamlined process which is an ideal pipeline for any NLP tasks.

It is an object of the present disclosure to provide an automated system and a method for stacking embeddings and for the different stages in the pipeline. The five pipeline stages are Lexical, Syntactic, Semantic, transactional, and language agnostic stages to retrofit the word embeddings.

It is an object of the present disclosure to provide a system and a method to eliminate the unavailability of the data or all the characteristics of the words which are not properly incorporated in the word embeddings.

SUMMARY

This section is provided to introduce certain objects and aspects of the present invention in a simplified form that are further described below in the detailed description. This summary is not intended to identify the key features or the scope of the claimed subject matter.

In an aspect, the present disclosure provides a system for facilitating Knowledge Nugget (K-Nugget) discovery and retrofitting framework as a Self-Organizing Tree Algorithm (SOTA) factory. The system receives a set of word embeddings. The word embeddings comprise vector representations of a word. The word embeddings comprise a context of a word in a document, a semantic similarity of words and a syntactic similarity of words, and a relation of a word with other words. Further, the system computes a similarity score and a dissimilarity score between every pair of word embeddings in the received set of word embeddings. Further, the system determines a margin value for every pair of word embeddings based on the respective similarity score and the respective dissimilarity score.

Further, the system discovers K-nuggets for every pair of word embeddings based on the respectively determined margin value by a dynamic retrofitted embedding approach. The K-nuggets for every pair of word embeddings represent relations between synonyms of words. The K-nuggets are discovered lexically by an extraction of basic lexicons from the word embeddings to obtain spell variants, phonetically similar variants, and morphological variants of words. The K-nuggets are discovered lexically for a character-level understanding of words and a context of words. The K-nuggets are discovered syntactically by determining synonyms of words, antonyms of words, hypernyms of words, hyponyms of words, entity substitutes of words, and entity complements of words.

The K-nuggets are discovered syntactically to detect n-gram entities for finding relations between synonyms of words. The K-nuggets are discovered semantically by extracting relational concepts of word embeddings in a given context. The K-nuggets are discovered by a stacked embedding approach to solve perplexity of words with respect to surrounding context based on the similarity score and the dissimilarity score.

The K-nuggets are discovered by a traditional knowledge approach by extracting a long-range context information of words and a short-range context information of words. The K-nuggets are discovered by a language-agnostic knowledge approach by identifying dialects of pronunciation of a word. The retrofitted embedding approach is implemented on the word embeddings by using global domain knowledge. Furthermore, the system determines closer synonymous vectors based on the discovered K-nuggets by applying a Self-Organizing Tree Algorithm approach.

In an aspect, the present disclosure provides a method for facilitating Knowledge Nugget (K-Nugget) discovery and retrofitting framework as a Self-Organizing Tree Algorithm (SOTA) factory. The method includes receiving a set of word embeddings. The word embeddings comprise vector representations of a word. The word embeddings comprise a context of a word in a document, a semantic similarity of words and a syntactic similarity of words, and a relation of a word with other words. Further, the method includes computing a similarity score and a dissimilarity score between every pair of word embeddings in the received set of word embeddings. Further, the method includes determining a margin value for every pair of word embeddings based on the respective similarity score and the respective dissimilarity score.

Further, the method includes discovering K-nuggets for every pair of word embeddings based on the respectively determined margin value by a dynamic retrofitted embedding approach. The K-nuggets for every pair of word embeddings represent relations between synonyms of words. The K-nuggets are discovered lexically by an extraction of basic lexicons from the word embeddings to obtain spell variants, phonetically similar variants, and morphological variants of words. The K-nuggets are discovered lexically for a character-level understanding of words and a context of words.

The K-nuggets are discovered syntactically by determining synonyms of words, antonyms of words, hypernyms of words, hyponyms of words, entity substitutes of words, and entity complements of words. The K-nuggets are discovered syntactically to detect n-gram entities for finding relations between synonyms of words. The K-nuggets are discovered semantically by extracting relational concepts of word embeddings in a given context. The K-nuggets are discovered by a stacked embedding approach to solve perplexity of words with respect to surrounding context based on the similarity score and the dissimilarity score.

The K-nuggets are discovered by a traditional knowledge approach by extracting a long-range context information of words and a short-range context information of words. The K-nuggets are discovered by a language-agnostic knowledge approach by identifying dialects of pronunciation of a word. The retrofitted embedding approach is implemented on the word embeddings by using global domain knowledge. Furthermore, the method includes determining closer synonymous vectors based on the discovered K-nuggets by applying a Self-Organizing Tree Algorithm approach.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 5 illustrates an exemplary representation (500) of phonetical variants, in accordance with an embodiment of the present disclosure.

FIG. 6 illustrates an exemplary representation (600) of morphological variants, in accordance with an embodiment of the present disclosure.

FIGS. 7A and 7B illustrate an exemplary representation (700a and 700b) of morphological variants, in accordance with an embodiment of the present disclosure.

FIG. 8 illustrates an exemplary representation (800) of syntactic information, in accordance with an embodiment of the present disclosure.

FIGS. 9A and 9B illustrate an exemplary representation (900a and 900b) of extracts relational concepts of the word embedding, in accordance with an embodiment of the present disclosure.

FIGS. 12A and 12B illustrate an exemplary representation (1200a and 1200b) of extracting contexts of the word embedding, in accordance with an embodiment of the present disclosure.

FIG. 13 illustrates an exemplary representation (1300) of extracts entities Indic knowledge, in accordance with an embodiment of the present disclosure.

Figure 1:
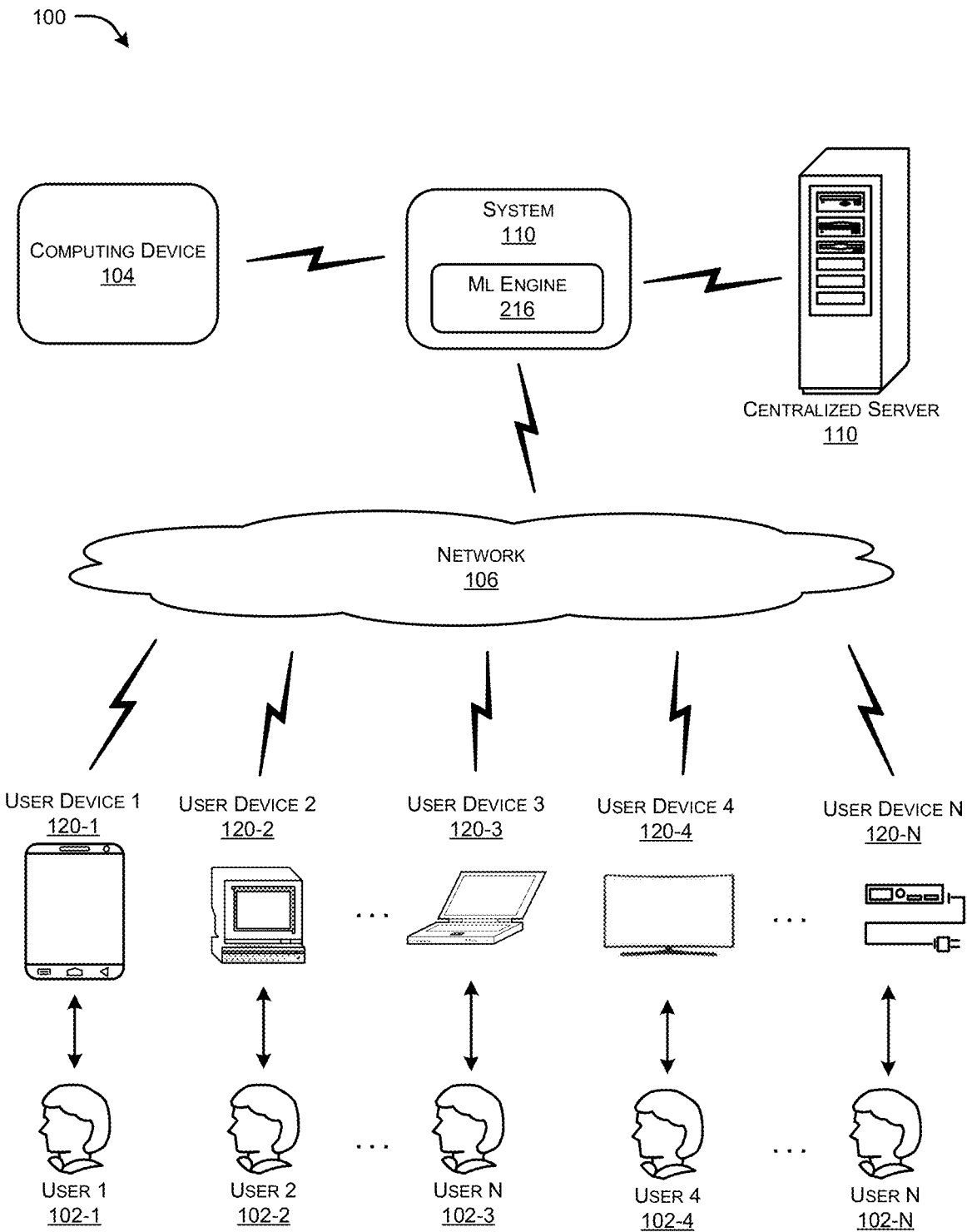
FIG. 1 illustrates exemplary network architecture representation (100) in which or with which a system (110) of the present disclosure can be implemented, in accordance with an embodiment of the present disclosure.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Referring to FIG. 1 which illustrates an exemplary network architecture (100) in which or with which system (110) of the present disclosure can be implemented, in accordance with an embodiment of the present disclosure. As illustrated in FIG. 1, by way of example but not limitation, the exemplary architecture (100) may include a user (102) associated with a user computing device (120) (also referred to as user device (120)) and at least a network 106. More specifically, the exemplary architecture (100) includes a system (110) equipped with a machine learning (ML) engine (216) for facilitating dynamic retrofitting for each entity pair by using a loss function based on a similarity of a pair of words, which define a margin value in the loss function. The system (110) may be configured to receive a set of data packets. In an exemplary embodiment, the set of data packets may include word embeddings (for example words, colours but not limited to the like).

The system (110) may be then configured to compute a similarity score and a dissimilarity score between the pair words to be used for retrofitting. Thereby, the margin value gets dynamically modified which determines how much closer synonymous vectors should be to each other than to their respective negative examples.

In an embodiment, the user can gain access to the system only when he/she has been identified and authorized by the system. In an embodiment, the user may include, but not limited to, an existing customer, a potential customer, a research analyst, or any other person interested to know about the services offered by the entity.

In an embodiment, the computing device (104) and/or the user device (120) may communicate with the system (110) via a set of executable instructions residing on any operating system. In an embodiment, the computing device (104) and/or the user device (120) may include, but not limited to, any electrical, electronic, electro-mechanical or any equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen and the like. It may be appreciated that the computing device (104) and/or the user device (120) may not be restricted to the mentioned devices and various other devices may be used. A smart computing device may be one of the appropriate systems for storing data and other private/sensitive information.

In an exemplary embodiment, the network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof.

Figure 2:
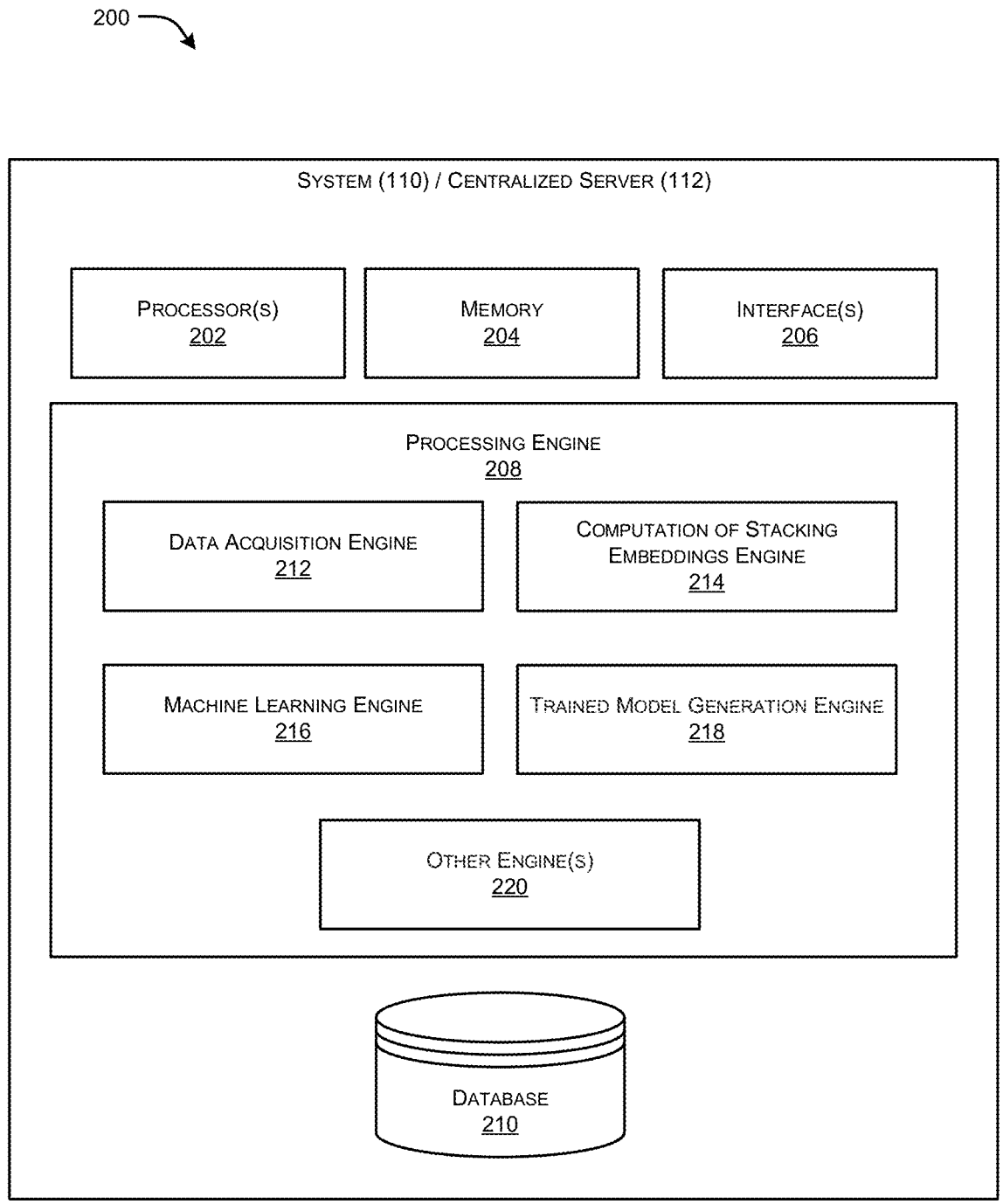
FIG. 2 illustrates an exemplary representation (200) of the system (110), in accordance with an embodiment of the present disclosure.

In an embodiment, the system (110) may include one or more processors coupled with a memory, wherein the memory may store instructions which when executed by the one or more processors may cause the system to perform a Knowledge Nugget (K-Nugget) discovery and a retrofitting framework as a SOTA factory. FIG. 2 with reference to FIG. 1, illustrates an exemplary representation of the system (110) for facilitating Knowledge Nugget (K-Nugget) discovery and retrofitting framework as a SOTA factory, in accordance with an embodiment of the present disclosure. In an aspect, the system (110)/may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (206) of the system (110). The memory (206) may be configured to store one or more computer-readable instructions or routines in a non-transitory computer readable storage medium, which may be fetched and executed to create or share data packets over a network service. The memory (206) may comprise any non-transitory storage device including, for example, volatile memory such as RAM, or non-volatile memory such as EPROM, flash memory, and the like.

In an embodiment, the system (110) may include an interface(s) (204). The interface(s) 204 may comprise a variety of interfaces, for example, interfaces for data input and output devices, referred to as I/O devices, storage devices, and the like. The interface(s) 204 may facilitate communication of the system (110). The interface(s) 204 may also provide a communication pathway for one or more components of the system (110). Examples of such components include, but are not limited to, processing engine(s) (208) and a database (210). The database (210) may be configured to store the word embeddings for the K-nugget discovery.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor-executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may comprise the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry.

Figure 3:
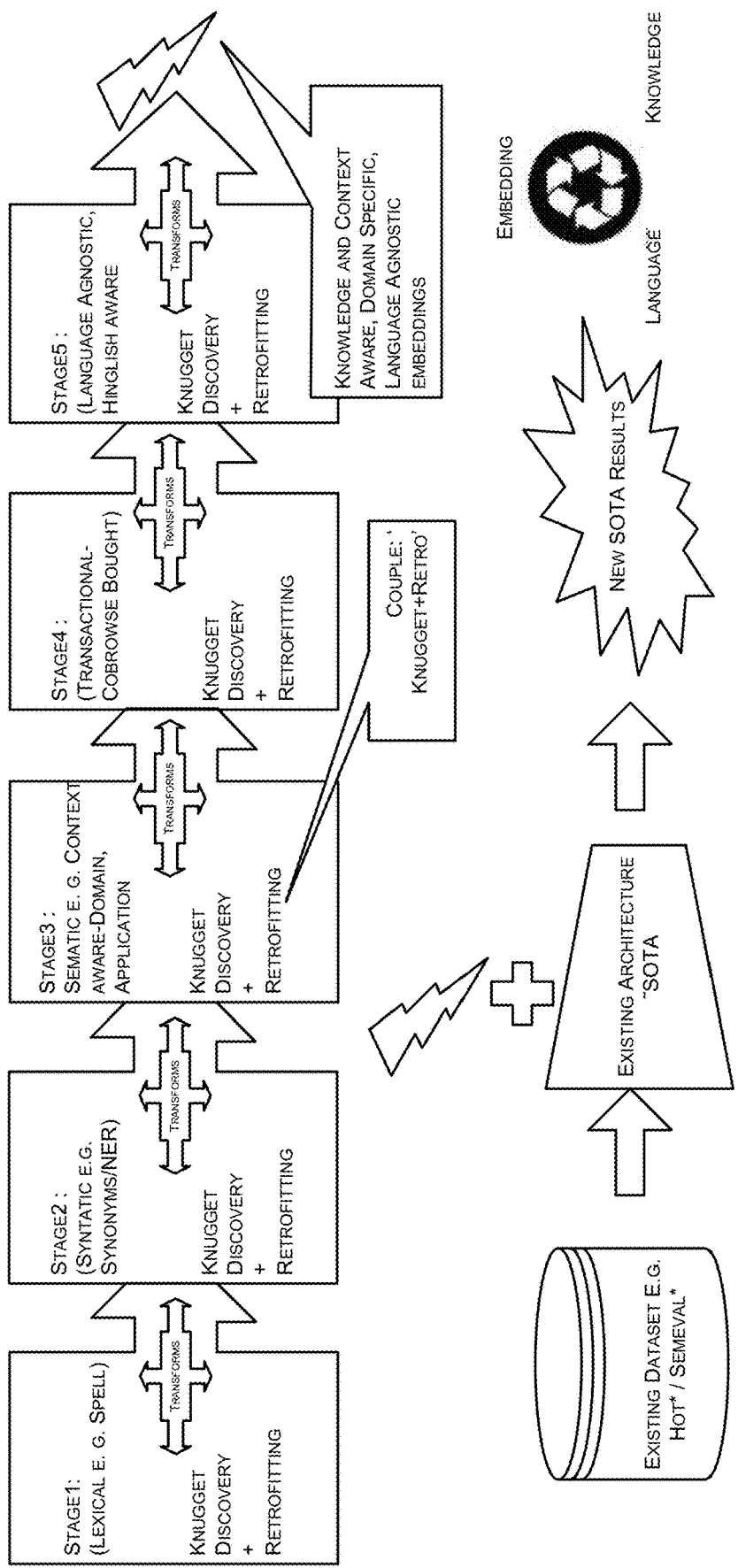
FIG. 3 illustrates an exemplary representation (300) of the system (110) for different stages of stacking embeddings, in accordance with an embodiment of the present disclosure.

The processing engine (208) may include one or more engines selected from any of a data acquisition engine (212), a computation of stacking embeddings engine (214), and a machine learning (ML) engine (216). In an embodiment, the data acquisition engine (212) of the system (110) can receive a set of data packets pertaining to a set of word embeddings. The computation of stacking embeddings engine (214) may compute stacking embeddings for different stages in a K-nugget discovery pipeline which may include five stages. Five stages of the K-nugget discovery pipeline may be Lexical, Syntactic, Semantic, transactional, and language-agnostic stages to retrofit the word embeddings. The ML engine (216) may be further configured to dynamically modify a margin value for every pair of word embeddings. The ML engine (216) may be further configured to determine closer synonymous vectors based on the discovered K-nuggets by applying a Self-Organizing Tree Algorithm approach FIG. 3 illustrates an exemplary representation (300) of the system (110) for different stages of the K-nugget discovery pipeline, in accordance with an embodiment of the present disclosure.

In an embodiment, Stage 1 of the K-nugget discovery pipeline comprises Lexical K-nuggets. In Stage 1, the system (110) may extract basic lexicons of a given context from the word embeddings. In an embodiment, Stage 2 of the K-nugget discovery pipeline comprises Syntactical K-nuggets. After lexical information phrasing in Stage 1 of the K-nugget discovery pipeline, important syntactical concepts such as synonyms, antonyms, hypernyms, hyponyms, entity substitutes, and entity complements of words are extracted and used by the system (110) to understand the word (embeddings) in a generalized way matching through various contexts of conceptual information. Further, the embeddings are retrofitted using global domain knowledge in Stage 2 of the K-nugget discovery pipeline. In Stage 3 of the K-nugget discovery pipeline, the system (110) may perform intent understanding based on a Stacked Embedding approach. By the Stacked Embedding approach, the system (110) may compare the similarity score based on a hierarchy of concepts and thus, relate the similarity score to lower-level stacked embeddings. In Stage 4 of the K-nugget discovery pipeline, transactional knowledge may be taken into consideration for K-nugget discovery. In Stage 4 of the K-nugget discovery pipeline, the system (110) may extract a long-range context and a short-range context from the word embeddings. The long-range context extracted from the word embeddings by the system (110) may include association growth rules extracted from transactional knowledge. The short-range context extracted from the word embeddings by the system (110) may include word context information extracted within a given sentence like entity substitutes In Stage 5 of the K-nugget discovery pipeline, the system (110) may perform Language Agnostic K-nugget discovery: In Stage 5 of the K-nugget discovery pipeline, the system (110) may extract entities Indic knowledge based on various dialects by which a product may be known across geographical locations.

Figure 4:
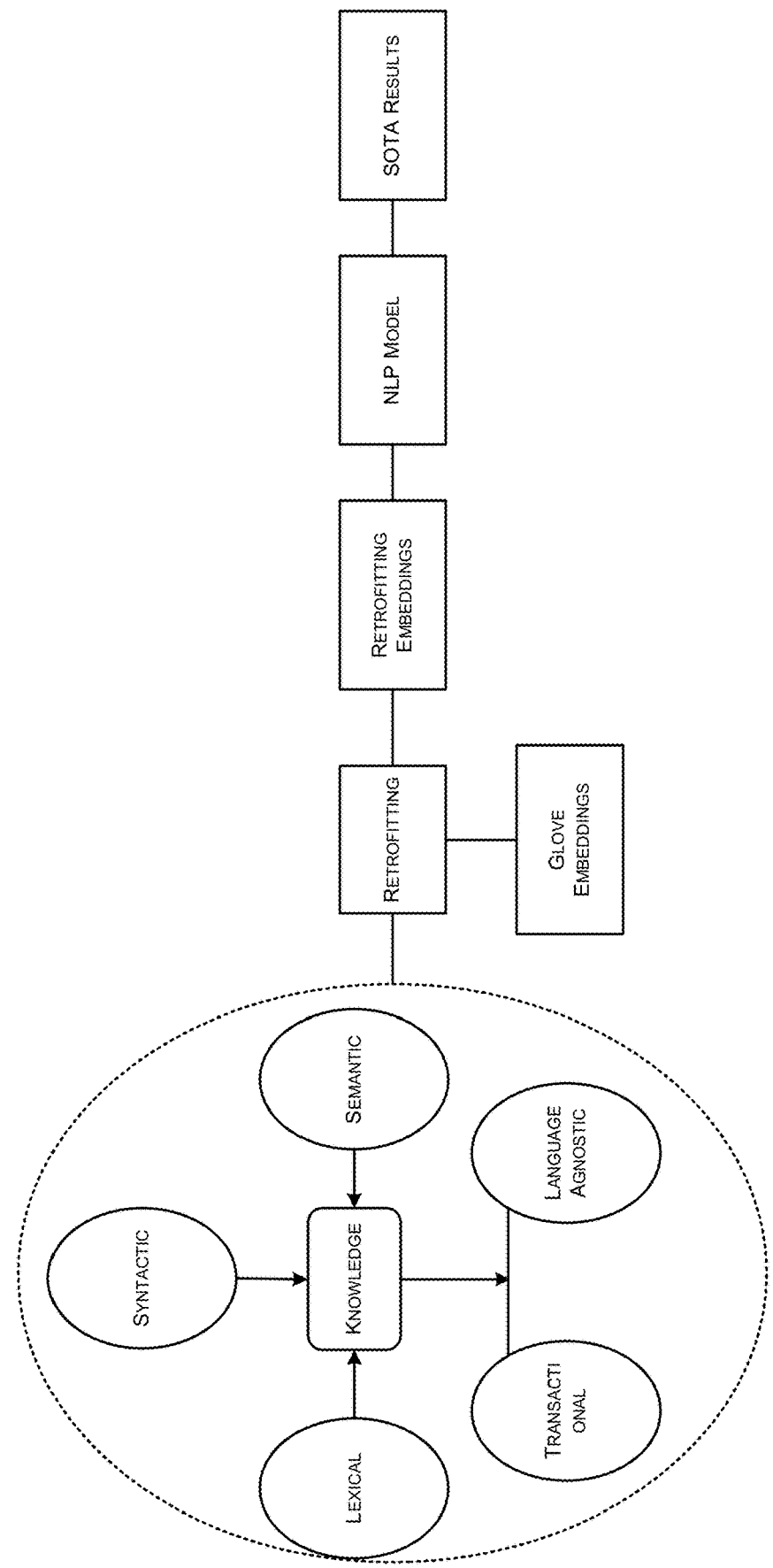
FIG. 4 illustrates exemplary representation (400) of the system (110) for different stages of stacking embeddings along with glove embeddings which gives SOTA results, in accordance with an embodiment of the present disclosure.

FIG. 4 illustrates an exemplary representation (400) of the system (110) for different stages of stacking embeddings along with glove embeddings which may yield SOTA results, in accordance with an embodiment of the present disclosure. The K-nugget discovery for every pair of word embeddings may take place in five stages of the K-nugget discovery pipeline (402). Next, a dynamic retrofitted embedding approach may be applied to the k-nuggets (404) with Glove embedding (406) to obtain retrofitting embeddings (408). The retrofitting embeddings may be fed to an NLP model (410) and a Self-Organizing Tree Algorithm (SOTA) approach may be applied to the NLP model output to yield SOTA results (412) for determining closer synonymous vectors based on the discovered K-nuggets.

FIG. 5 illustrates an exemplary representation (500) of phonetic variants of word embeddings extracted by the system (110), in accordance with an embodiment of the present disclosure. As illustrated in the figure, the system may extract the basic lexicons of the given context such as spell variants of word embeddings that may occur due to incorrect typing of words by fat fingers. The basic lexicons extracted from the word embeddings by the system (110) may also include phonetically similar variants of words, as depicted in the figure. These spell variants of words and the phonetically similar variants of words may be extracted across various domains like grocery, media, fashion, pharma etc.

FIG. 6 illustrates an exemplary representation (600) of morphological variants of word embeddings extracted by the system (110), in accordance with an embodiment of the present disclosure. As illustrated in the figure, the system (110) may extract morphological variants of word embeddings at Stage 1 of the K-nugget discovery pipeline. The extracted extract morphological variants of word embeddings may be words expressed in tense form or with prefixes. The system (110) may extract morphological variants of word embeddings for character-level understanding of words and adjacent context. Further, the word embeddings may be retrofitted with global knowledge to form well-refined embeddings for improved lexical-level understanding.

Figures 7B, 8:
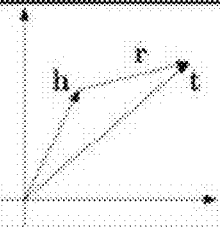

FIGS. 7A and 7B illustrate an exemplary representation (700 and 700b) of morphological variants, in accordance with an embodiment of the present disclosure.

In an embodiment, as illustrated in FIG. 7A, a FastText Model has been used for training general grammar sentences received by the system (110) for K-nugget discovery. The FastText Model may be used to capture morphological prefixes of a word 'Plays' using a cosine similarity score which leverages a strong lexical prefix understanding of words, as illustrated in FIG. 7A.

In an embodiment, as illustrated in FIG. 7A, a word 'Played' may get boosted by Lexical Delta Boosting Method with an application of a weighted score. The weighted score may get boosted by adding "transformation" embedding to a root word and then projecting it to near vocabulary words, as illustrated in FIG. 7B. The weighted score may be boosted further based on a weighted similarity score and a rate of displacement of the word from a vanilla level similarity score.

Weighted Score=($w1*$score+$w2*dy/dx$[rate of change])

Where w1, w2 are learnable parameters dy/dx represents similarity deviation from root word similarity.

Score represents root word similarity

FIG. 8 illustrates an exemplary representation (800) of extracting syntactic information by the system (110) in Stage 2 of the K-nugget discovery pipeline, in accordance with an embodiment of the present disclosure.

In an embodiment, the system (110) may extract syntactical variants of the word embeddings such as synonyms, antonyms, hypernyms, hyponyms, entity substitutes, and entity complements of words in Stage 2 of the K-nugget discovery pipelines. The extracted syntactical variants of the word embeddings may be used to understand the word embeddings in a generalized way through various contexts of conceptual information. Further, the system (110) may retrofit the word embeddings by using global domain knowledge for K-nugget discovery.

In an embodiment, as illustrated in FIG. 8, the syntactical variants of the word embeddings may be used by the system (110) to detect n-gram entities for entity recognition. The n-gram entities may be used by the system (110) for extracting knowledge nuggets. The system (110) may also use the n-gram entities for important relations between synonyms, such as 'Awesome' is similar to 'Fabulous'.

FIGS. 9A and 9B illustrate an exemplary representation (900a and 900b) of extracting relational concepts of the word embeddings by the system (110) in Stage 3 of the K-nugget discovery pipeline, in accordance with an embodiment of the present disclosure.

In an embodiment, as illustrated in FIGS. 9A and 9B, the system (110) may extract semantic variants of word embeddings in Stage 3 of the K-nugget discovery pipeline. In Stage 3 that may be the semantic stage, the system (110) may extract relational concepts of the word embeddings in a given context. In an example, concepts such as SRK, in a Movie Domain, may map to Shahrukh Khan. In an another example, popular slogans such as "Just Do It" may map to 'Nike'. The mapping may be nuggets may be extracted by the system (110) in the semantic stage of the K-nugget discovery pipeline.

In Stage 3 of the K-nugget discovery pipeline, the system (110) may also perform a significant task of intent understanding based on the Stacked Embedding approach. The Stacked Embedding approach may compare the similarity score between every pair of word embeddings based on the hierarchy of concepts and thus, may relate it to lower-level stacked word embeddings.

Figure 10:
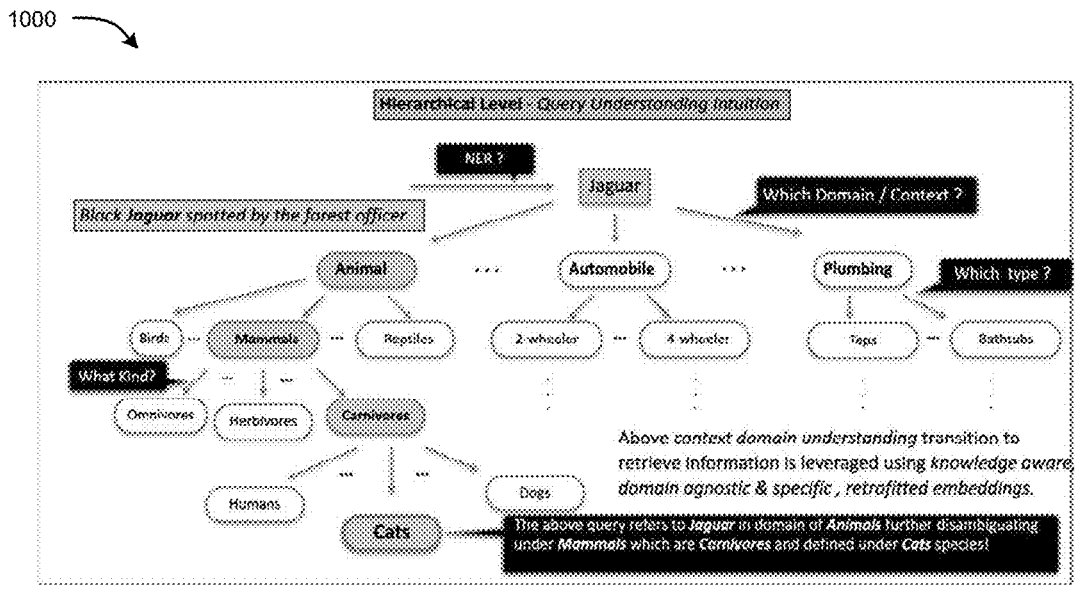
FIG. 10 illustrates an exemplary representation (1000) of stacked embeddings, in accordance with an embodiment of the present disclosure.

FIG. 10 illustrates an exemplary representation (1000) of hierarchical level query understanding intuition of the stacked embeddings approach used by the system (110) for K-nugget discovery, in accordance with an embodiment of the present disclosure.

In an embodiment, as illustrated in FIG. 10, 'Jaguar' could be an automobile or an animal, or a plumbing company. The system (110) may disambiguate the entities based on a given context by applying the stacked embeddings approach. This stacked embeddings approach may solve a perplexity of words based on a relevance of the words with regard to the surrounding context. Further, the stacked embeddings approach may enable a comparison of k-nuggets with a stacked hierarchy of k-nuggets for better intuition.

Figure 11:
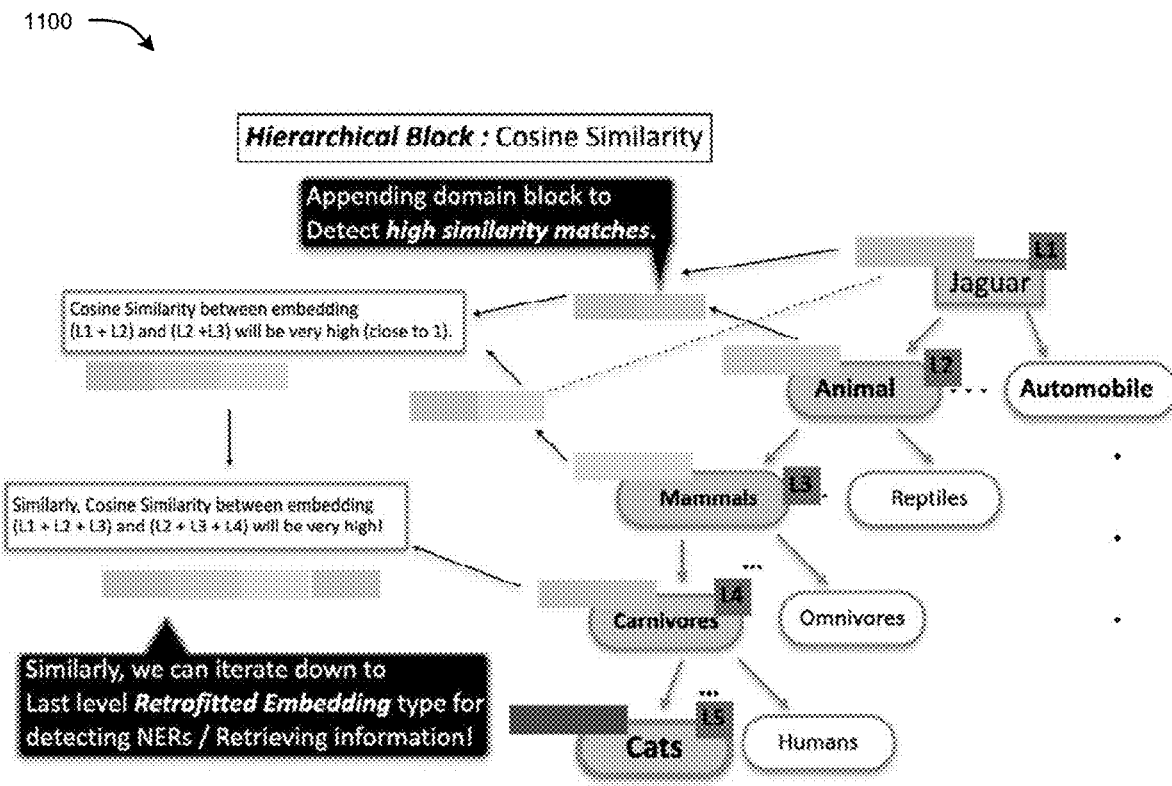
FIG. 11 illustrates an exemplary representation (1100) of hierarchical Block iteration, in accordance with an embodiment of the present disclosure.

FIG. 11 illustrates an exemplary representation (1100) of hierarchical block iteration, in accordance with an embodiment of the present disclosure.

In an embodiment, as illustrated in FIG. 11, the system (110) may apply a Hierarchical Block iteration technique on word embeddings by using cosine similarity for recognizing granular-level or category-level retrofitted embeddings. The granular-level or category-level retrofitted embeddings may be Knowledge Aware, Domain-Specific, and Domain-agnostic. The granular-level or category-level retrofitted embeddings may be powerful and efficient in detecting all kinds of hierarchal closeness of specific domain entities across any possible category level.

FIGS. 12A and 12B illustrate an exemplary representation (1200a and 1200b) of extracting contexts of the word embedding by the system (110) in Stage 4 of the K-nugget discovery pipeline, in accordance with an embodiment of the present disclosure.

In an embodiment, as illustrated in FIGS. 12A and 12B, the system (110) may use Transactional Knowledge for K-nugget discovery in Stage 4 of the K-nugget discovery pipeline. In Stage 4 of the K-nugget discovery pipeline, the system (110) may extract a long-range context from the word embeddings by using transactional knowledge. The long-range context extracted from the word embeddings by the system (110) may include association growth rules extracted from transaction history, as illustrated in FIG. 12A.

In an embodiment, as illustrated in FIG. 12B, the system (110) may extract a short-range context from the word embeddings by using transactional knowledge. The short-range context extracted from the word embeddings by the system (110) may include word context information extracted from a given sentence such as entity substitutes, as illustrated in FIG. 12B.

FIG. 13 illustrates an exemplary representation (1300) of using Indic knowledge for extracting Indic Knowledge entities from the word embeddings by the system (110) in Stage 5 of the K-nugget discovery pipeline, in accordance with an embodiment of the present disclosure.

In an embodiment, as illustrated in FIG. 13, the system (110) may extract Indic Knowledge entities from the word embeddings in Stage 5 of the K-nugget discovery pipeline. In Stage 5 of the K-nugget discovery pipeline, the system (110) may extract Indic entities based on various dialects by which a product is known across geographical locations, for example, 'pyaaz' (spelled in Delhi) is similar to 'kanda' (spelled in Mumbai). In FIG. 13, the system (110) may leverage language agnostic word knowledge from Stage 5 to decide whether text written in any language form has a positive sentiment, a negative sentiment, or a neutral sentiment based on word sentiment understanding in different dialects.

In another embodiment, a Dynamic Retrofitting Pipeline called as ATTRACT-REPEL retrofitting pipeline may have been used to fine-tune the word embeddings. The Dynamic Retrofitting Pipeline may give word pairs that may occur close together to each other and word pairs that may be placed far from each other. In the existing retrofitting algorithm, hyperparameters, lambda and margin (regulates the extent of retrofitting) may not change for the word pairs given in a training set. However, upon performing Sentiment analysis and Color to Color similarity task, it may be observed that the hyperparameters may be changed for every word pair because every word pair may differ from each other with respect to the extent by which they are similar or dissimilar.

In an embodiment, the Dynamic Retrofitting Pipeline may retrofit the word embeddings by calculating a use case relevance score using a classifier. A dynamic lambda parameter may then be calculated using a monotonic decreasing polynomial function. The dynamic lambda parameter may be a hyperparameter for L2 Norm applied to a cost function of the Attract-Repel algorithm to regulate updates in word embeddings. The higher the value of the dynamic lambda parameter, the lesser the updates in existing word embeddings. The cost function of the retrofitting function may be described as follows: equation (1)

$$C(\beta_S,\beta_A)=S(\beta_S)+A(\beta_A)+R(\beta_S,\beta_A) \quad \text{equation (1)}$$

where,
$A(\beta_s)$=Antonymy loss that may be responsible for taking two antonyms or dissimilar vectors far apart.

Figure 14:
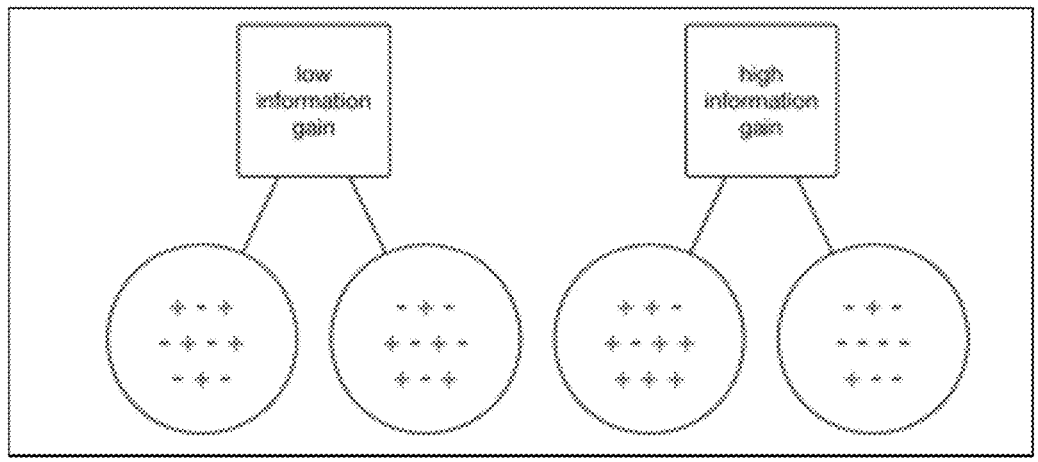
FIG. 14 illustrates an exemplary representation of high and low information gains, in accordance with an embodiment of the present disclosure.

$S(\beta_A)$=Synonymy loss that may be responsible for bringing the two synonyms or similar vectors close to each other
$R(\beta_S, \beta_A)$=Regularization loss may be responsible for preserving or modifying the exiting embedding of the given words.

$$S(\beta_S) = \Sigma_{(x_1,x_r)\in\beta_S} \max(0, (\delta *_{syn} +x_i t_i - x_i x_r)) + \max(0, (\delta *_{syn} +x_r t_r - x_i x_r))]$$

$$A(\beta_A) = \sum_{(x_i,x_r)\in\beta_A} [\max(0, (\delta *_{ant} +x_i x_r - x_i t_i)) + \max(0, (\delta *_{ant} +x_i x_r - x_r t_r))]$$

$$R(B_S, B_A) = \sum_{x_i \in V(B_S \cup B_A)} \lambda^*_{reg} \|\hat{x}_i - x_i\|_2$$

where, A* and δ* are the hyperparameters that may be changed using the relevance score and the monotonic decreasing function as described above and in FIG. 14.

| Gini Index | Entropy |
|---|---|
| $I_G = 1 - \sum_{j=1}^{c} p_j^2$ | $I_H = -\sum_{j=1}^{c} p_j \log_2(p_j)$ |
| pj. proportion of the samples that belongs to class c for a particular node. | p_j: proportion of the samples that belongs to class c for a particular node.<br>*This is the definition of entropy for all non-empty classes (p ≠ 0). The entropy is 0 if all samples at a node belong to the same class. |

In another embodiment, the system (110) may automatically compute the value of the dynamic lambda parameter by calculating an entropy for the reference word. Labels to the words can be assigned using a use case-based classification model.

In another embodiment, if the word has mixed senses, the entropy, at this instance, may be higher hence the value of the dynamic lambda parameter may be lower to make substantial changes to the nearby embedding vectors. On the other side, if the entropy may be lower then the dynamic lambda parameter may be higher to make minimal changes to the nearby embedding vectors. In such a case, there may be less disambiguation and hence the system (110) may be able to modify the dynamic lambda parameter accordingly. Using the dynamic retrofitted pipeline, the system (110) may achieve smoother word embeddings to obtain SOTA results in various NLP Tasks.

In another embodiment, as represented in Table 1, a publicly available challenge has been chosen for sentiment analysis on English and Hinglish datasets: HOT dataset and SemEval Task—9. A Glove embedding may have been retrofitted for the most frequent words obtained after removing stop words. Further, the stop words may have been chosen carefully so that it does not lead to the loss of information. In an example: "not" may be considered one of the stop words in a Natural Language Toolkit (NLTK). But "not" may not be an important word signifying negation in the sentence that is important for sentiment analysis.

The English and Hinglish datasets may have three classes that may be positive, neutral, and negative. In order to test value addition done by the word embeddings obtained from the Dynamic Retrofitted Pipeline, the embedding layer may be replaced with the embeddings obtained from the Dynamic Retrofitted Pipeline, while keeping the rest of the model architecture and pre-processing steps the same.

TABLE 1

| Dataset | Accuracy Using Default glove fine t8uned with Hinglish Dataset (Paper) | Accuracy Using Retrofitted Cross lingual-semantically Aware Embeddings (Ours) | Difference |
|---|---|---|---|
| English Dataset | 83.90% | 89.13% | 5.23% |
| HOT Dataset | 76.00%** | 83.41% | 7.14% |
| SemEval Dataset (Hinglish) | 56.40%** | 59.70% | 3.3% |
| SemEval Dataset (Hinglish) | 70.06% (BERT) | 72.40% (GRU) | 2.34% |

Figure 15:
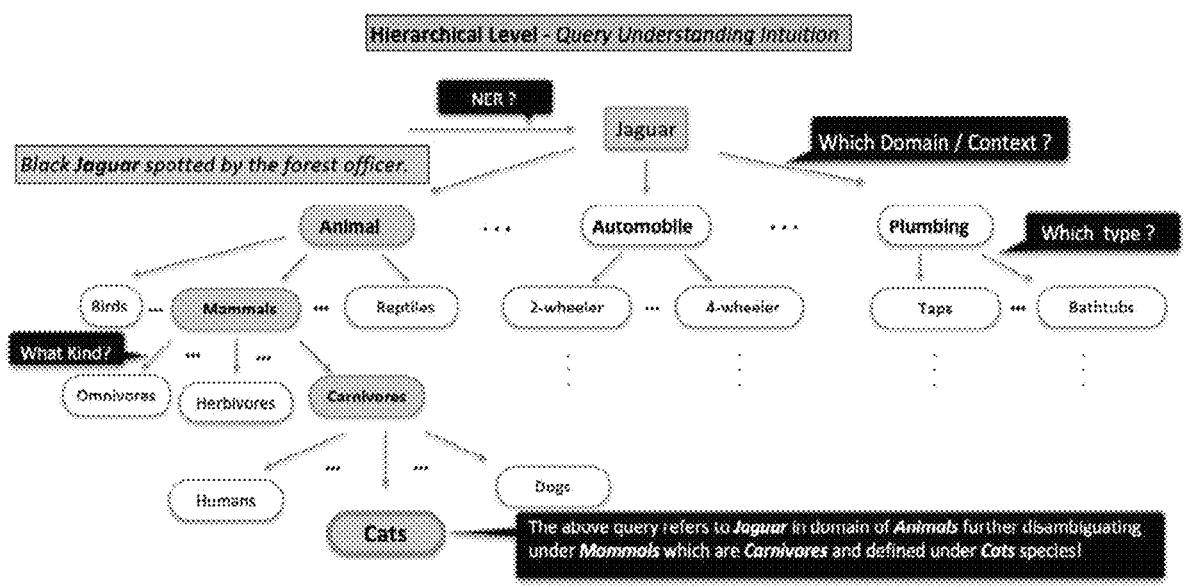
FIG. 15 illustrates an exemplary representation (1500) of Disambiguation in intent understanding using Retrofitted Embedding using stacked embeddings, in accordance with an embodiment of the present disclosure.

FIG. 15 illustrates an exemplary representation (1500) of disambiguation in intent understanding by the system (110) of using retrofitted embedding by stacking the embeddings, in accordance with an embodiment of the present disclosure.

It is generally known that English language has many words which have multiple meanings. An exact intent or meaning of a word may only be inferred by looking at the context. Such a context domain understanding transition to retrieve information may be leveraged by the system (110) by using knowledge aware, domain agnostic & specific, retrofitted embeddings. An embedding may be aware of all the intents. Specific embedding may be obtained when a retrofitted embedding may be coupled with domain agnostic vector. Let $E_{retrofitted}(w)$ is the retrofitted embedding vector for the word w. $U_d$=domain agnostic vector $$E_{domain} = E_{general} U_d$$

Figure 16:
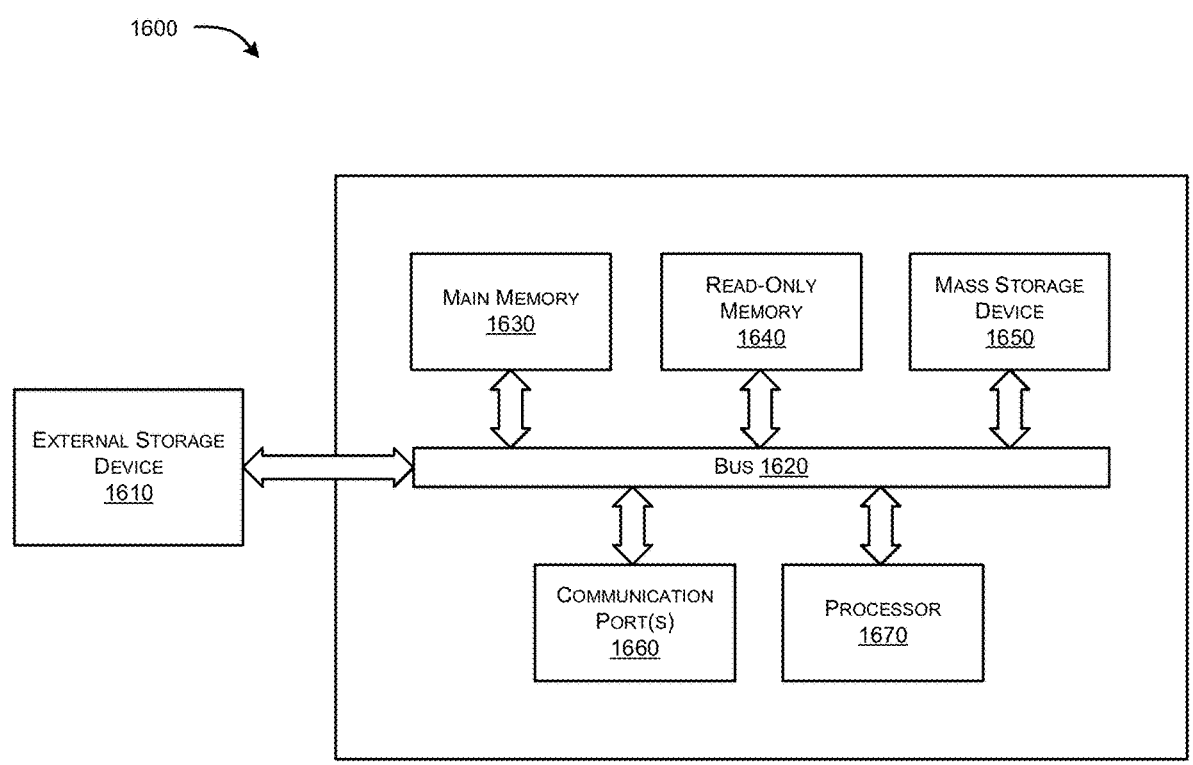
FIG. 16 illustrates an exemplary computer system (1600) in which or with which embodiments of the present invention can be utilized, in accordance with embodiments of the present disclosure.

FIG. 16 illustrates an exemplary computer system (1600) in which or with which embodiments of the present invention can be utilized in accordance with embodiments of the present disclosure. As shown in FIG. 16, computer system (1600) can include an external storage device (1610), a bus (1620), a main memory (1630), a read only memory (1640), a mass storage device (1650), a communication port (1660), and a processor (1670). A person skilled in the art will appreciate that the computer system may include more than one processor and communication ports. Examples of the processor (1670) include, but are not limited to, an Intel® Itanium® or Itanium 2 processor(s), or AMD® Opteron® or Athlon MP® processor(s), Motorola® lines of processors, FortiSOC™ system on chip processors or other future processors. The processor (1630) may include various modules associated with embodiments of the present invention. The communication port (1660) can be any of an RS-232 port for use with a modem based dialup connection, a 10/100 Ethernet port, a Gigabit or 10 Gigabit port using copper or fiber, a serial port, a parallel port, or other existing or future ports. The communication port (1660) may be chosen depending on a network, such a Local Area Network (LAN), Wide Area Network (WAN), or any network to which computer system connects. The memory (1630) can be Random Access Memory (RAM), or any other dynamic storage device commonly known in the art. The read-only memory (1640) can be any static storage device(s) e.g., but not limited to, a Programmable Read Only Memory (PROM) chips for storing static information e.g., start-up or BIOS instructions for the processor (1670). The mass storage (1650) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 13K800), one or more optical discs, Redundant Array of Independent Disks (RAID) storage, e.g. an array of disks (e.g., SATA arrays), available from various vendors.

The bus (1620) communicatively couples the processor(s) (1670) with the other memory, storage and communication blocks. The bus (1620) can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects the processor (1670) to software system.

Optionally, operator and administrative interfaces, e.g. a display, keyboard, and a cursor control device, may also be coupled to the bus (1620) to support direct operator interaction with a computer system. Other operator and administrative interfaces can be provided through network connections connected through the communication port (1660). The external storage device (1610) can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Advantages of the Present Disclosure

The present disclosure provides a system and method that can include certain benefits for a Plug and Play type of pipeline. The system and method of the present disclosure can improve performance of any Embedding-based NLP model by requiring less training data and less computational resources.

The present disclosure provides a system that may not override existing characteristics of a word in a word embedding but may fine-tune the word by preserving its characteristics before and after the retrofitting based on the NLP task.

The present disclosure provides a system and method that may discover the k-nuggets for retrofitting and stack the retrofitted embeddings. Further, the system and method of the present disclosure may use the retrofitted embeddings for NLP Tasks.

The present disclosure provides a system and method that may be used to create word embeddings to be used as feature vectors for training machine learning models such as a Question-Answer model assisting a chatbot, a Query-Understanding model for Retail, Health, and Education sectors, a Semantic analysis model for processing tweets or feedback from users, and a Name Entity Recognition model.

RESERVATION OF RIGHTS

A portion of the disclosure of this patent document contains material, which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

We claim:

1. A system for facilitating user meta data discovery and retrofitting framework, the system comprising:
    a processor;
    a memory coupled to the processor, wherein the memory comprises processor-executable instructions, which on execution, causes the processor to:
    receive a set of word embeddings;
    compute a similarity score and a dissimilarity score between every pair of word embeddings in the received set of word embeddings;
    determine a margin value for every pair of word embeddings based on the respective similarity score and the respective dissimilarity score;
    discover user meta data lexically for a character-level understanding of words for every pair of word embeddings based on the respectively determined margin value by a dynamic retrofitted embedding approach; and
    determine closer synonymous vectors based on the user meta data discovered for each pair of word embeddings.

2. The system as claimed in claim 1, wherein the word embeddings comprise vector representations of a word.

3. The system as claimed in claim 1, wherein the word embeddings comprise a context of a word in a document, a semantic similarity of words and a syntactic similarity of words, and a relation of a word with other words.

4. The system as claimed in claim 1, wherein the user meta data for every pair of word embeddings represents relations between synonyms of words.

5. The system as claimed in claim 1, wherein the user meta data is discovered lexically by an extraction of basic lexicons from the word embeddings to obtain spell variants, phonetically similar variants, and morphological variants of words.

6. The system as claimed in claim 1, wherein the user meta data is discovered lexically for understanding a context of words.

7. The system as claimed in claim 1, wherein the user meta data is discovered syntactically by determining synonyms of words, antonyms of words, hypernyms of words, hyponyms of words, entity substitutes of words, and entity complements of words.

8. The system as claimed in claim 1 wherein the user meta data is discovered syntactically to detect n-gram entities for finding relations between synonyms of words.

9. The system as claimed in claim 1, wherein the user meta data is discovered semantically by extracting relational concepts of word embeddings in a given context.

10. The system as claimed in claim 1, wherein the user meta data is discovered by a stacked embedding approach to solve perplexity of words with respect to surrounding context based on the similarity score and the dissimilarity score.

11. The system as claimed in claim 1, wherein the user meta data is discovered by a traditional knowledge approach by extracting a long-range context information of words and a short-range context information of words.

12. The system as claimed in claim 1, wherein the user meta data is discovered by a language-agnostic knowledge approach by identifying dialects of pronunciation of a word.

13. The system as claimed in claim 1, wherein the retrofitted embedding approach is implemented on the word embeddings by using global domain knowledge.

14. A method for facilitating user meta data discovery and retrofitting framework, the method comprising:
    receiving, by a processor, a set of word embeddings;
    computing, by the processor, a similarity score and a dissimilarity score between every pair of word embeddings in the received set of word embeddings;
    determining, by the processor, a margin value for every pair of word embeddings based on the respective similarity score and the respective dissimilarity score;
    discovering, by the processor, user meta data lexically for a character-level understanding of words for every pair of word embeddings based on the respectively determined margin value by a dynamic retrofitted embedding approach; and
    determining, by the processor, closer synonymous vectors based on the user meta data discovered for each pair of word embeddings.

15. The method as claimed in claim 14, wherein the word embeddings comprise vector representations of a word.

16. The method as claimed in claim 14, wherein the word embeddings comprise a context of a word in a document, a semantic similarity of words and a syntactic similarity of words, and a relation of a word with other words.

17. The method as claimed in claim 14, wherein the user meta data for every pair of word embeddings represents relations between synonyms of words.

18. The method as claimed in claim 14, wherein the user meta data is discovered lexically by an extraction of basic lexicons from the word embeddings to obtain spell variants, phonetically similar variants, and morphological variants of words.

19. The method as claimed in claim 14, wherein the user meta data is discovered lexically for understanding a context of words.

20. The method as claimed in claim 14, wherein the user meta data is discovered syntactically by determining synonyms of words, antonyms of words, hypernyms of words, hyponyms of words, entity substitutes of words, and entity complements of words.

21. The method as claimed in claim 14, wherein the user meta data is discovered syntactically to detect n-gram entities for finding relations between synonyms of words.

22. The method as claimed in claim 14, wherein the user meta data is discovered semantically by extracting relational concepts of word embeddings in a given context.

23. The method as claimed in claim 14, wherein the user meta data is discovered by a stacked embedding approach to solve perplexity of words with respect to surrounding context based on the similarity score and the dissimilarity score.

24. The method as claimed in claim 14, wherein the user meta data is discovered by a traditional knowledge approach by extracting a long-range context information of words and a short-range context information of words.

25. The method as claimed in claim 14, wherein the user meta data is discovered by a language-agnostic knowledge approach by identifying dialects of pronunciation of a word.

26. The method as claimed in claim 14, wherein the retrofitted embedding approach is implemented on the word embeddings by using global domain knowledge.

\* \* \* \* \*